US006894459B2

(12) United States Patent
Howard et al.

(10) Patent No.: US 6,894,459 B2
(45) Date of Patent: May 17, 2005

(54) CHARGING METHOD FOR EXTENDING BATTERY LIFE IN THE PRESENCE OF HIGH TEMPERATURE

(75) Inventors: Jason N. Howard, Alpharetta, GA (US); Hossein Maleki, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 22 days.

(21) Appl. No.: 10/628,610

(22) Filed: Jul. 29, 2003

(65) Prior Publication Data

US 2005/0024022 A1 Feb. 3, 2005

(51) Int. Cl.[7] .................................................. H02J 7/16
(52) U.S. Cl. ....................................................... 320/150
(58) Field of Search ................................ 320/150, 151, 320/152, 132

(56) References Cited

U.S. PATENT DOCUMENTS

| | | | |
|---|---|---|---|
| 5,698,967 A | * | 12/1997 | Baer et al. .................. 320/152 |
| 5,710,501 A | * | 1/1998 | van Phuoc et al. ......... 307/150 |
| 6,025,699 A | | 2/2000 | Cummings |
| 6,111,389 A | | 8/2000 | Aranovich et al. |
| 6,342,774 B1 | | 1/2002 | Kreisinger et al. |
| 6,388,428 B1 | | 5/2002 | Rouverand et al. |
| 6,522,104 B1 | * | 2/2003 | Drori ......................... 320/149 |
| 6,531,846 B1 | * | 3/2003 | Smith ......................... 320/134 |

* cited by examiner

*Primary Examiner*—Michael Sherry
*Assistant Examiner*—Robert Grant
(74) *Attorney, Agent, or Firm*—Philip H. Burrus, IV

(57) ABSTRACT

A method of charging a battery is provided that alters the amount of energy stored within the battery based upon a temperature profile across time. Battery materials and components, like liquid electrolyte or electrodes for instance, can be damaged when a rechargeable cell is exposed to elevated temperatures for extended amounts of time, thereby reducing the overall amount of energy that may be stored within the cell. This method monitors stored energy capacity and temperature. When a fully-charged cell is held at a temperature that exceeds a predetermined temperature threshold for an extended amount of time, the method discharges the cell, thereby reducing the amount of energy stored within the cell. For example, when a single, lithium-ion cell is maintained at 4.2 V for over 10 hours, the method will discharge the cell by roughly 1% or 50 mV. The discharge may be either automatic, or at the prompt of a user.

16 Claims, 2 Drawing Sheets

CHARGING METHOD FOR EXTENDING BATTERY LIFE IN THE PRESENCE OF HIGH TEMPERATURE

BACKGROUND

1. Technical Field

This invention relates generally to charging methods for rechargeable battery packs, and more specifically to a charging method that considers both time and temperature in determining how to execute the charging process.

2. Background Art

As anyone who has ever worked on a laptop computer for extended periods of time knows, these devices can get rather warm. Central processors are running at ever higher speeds, and laptop computers tend to generate a lot of heat. This heat creates a problem for the rechargeable battery powering the laptop computer, in that excessive exposure to heat can degrade chemicals and other materials inside the electrochemical cells, thereby reducing their ability to store and deliver electrical energy.

For example, lithium-ion batteries—a popular choice for today's portable computers—include a liquid electrolyte that facilitates the flow of ions from the positive terminal to the negative terminal, and vice versa. This electrolyte, in addition to other battery chemicals, can react with active materials in the battery when exposed to high temperatures. Additionally, other materials and components in a battery, including electrode materials and separator materials, may degrade in the presence of high temperatures. The degradation causes the total amount of energy that can be stored in the battery's cells to become diminished. Simply put, a battery that originally provided four hours of run time may only provide two hours of run time after excessive exposure to heat.

One particularly harsh environment for a portable computer occurs when it is attached to a docking station. For instance, many people no longer use desktop computers. Instead, they opt for only a laptop computer. When they are at the office or at home, they connect the laptop computer to a docking station so as to use the laptop as if it were a desktop. The docking station generally includes peripherals like a monitor, keyboard, power supply and printer.

When the laptop computer is coupled to a docking station, the attached power supply charges the battery (if needed) and then continues to power the computer. Due to the small size of modern laptop computers, the fully-charged battery is often in close proximity with the hot central processor and other accompanying components. Consequently, the continued use of the computer—and the corresponding heat generated by the computer's electronics—causes the fully charged battery to become quite warm, thereby compromising reliability of the battery.

There is thus a need for an improved method of managing the state of charge of a rechargeable battery so as to prevent thermal deterioration due to excessive exposure to heat.

DETAILED DESCRIPTION OF THE INVENTION

Figure 1:
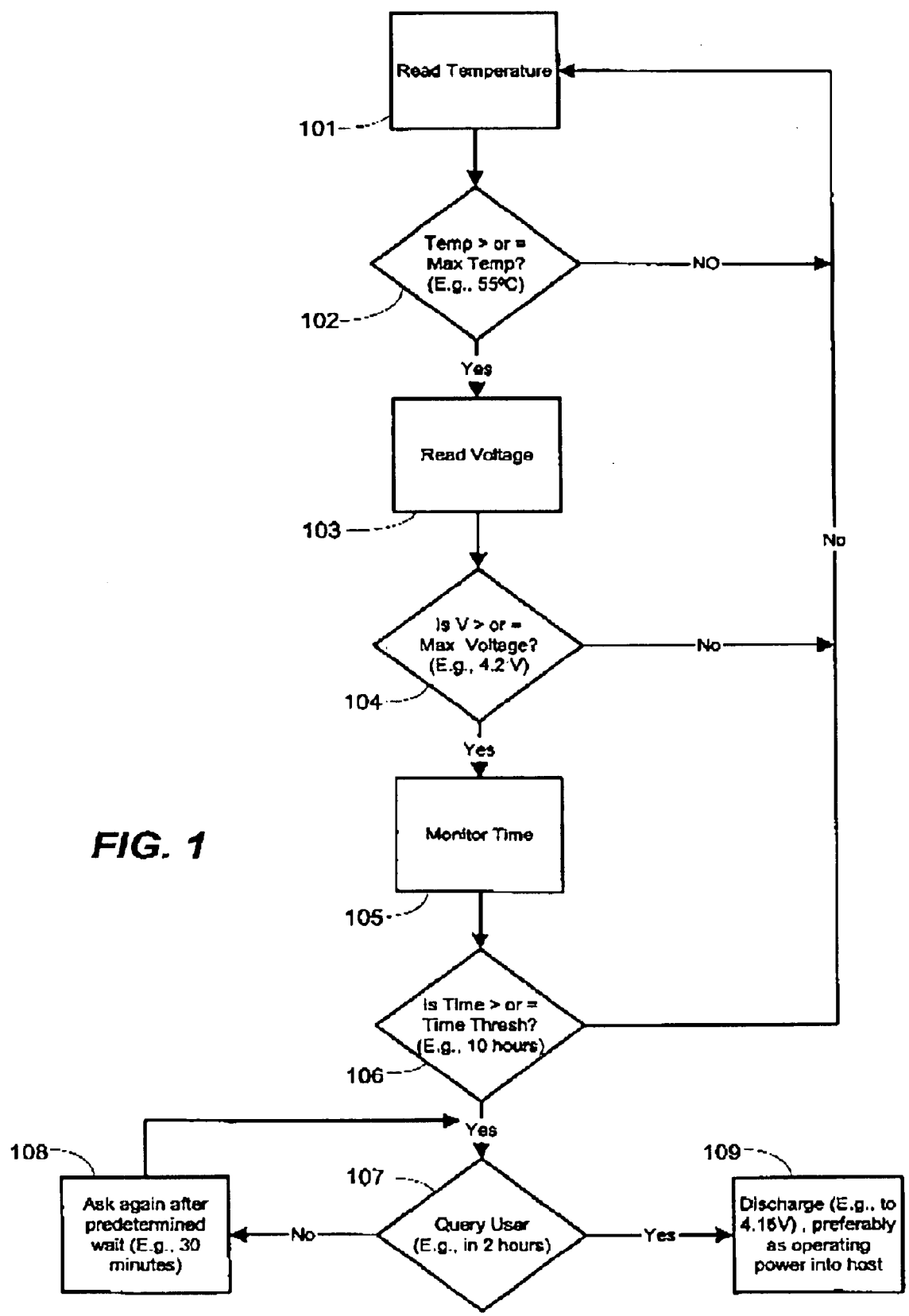
FIG. 1 illustrates a method of charging in accordance with the invention.

A preferred embodiment of the invention is now described in detail. Referring to the drawings, like numbers indicate like parts throughout the views. As used in the description herein and throughout the claims the following terms take the meanings explicitly associated herein, unless the context clearly dictates otherwise: the meaning of "a," "an," and "the" includes plural reference, the meaning of "in" includes "in" and "on."

A method of charging a battery is provided herein that adjusts the amount of energy stored within a battery's cells based upon a temperature profile across time. The inventors have determined that degradation of electrolyte and other cell components is a function of the amount of energy stored, battery temperature and the amount of time at which the cell is exposed to elevated temperatures. As such, this method reduces the amount of energy stored within a cell when it is exposed to elevated temperatures for extended periods of time.

Prior art methods have attempted to address the capacity degradation issue. For example, U.S. Pat. No. 6,111,389, entitled "Rapidly Charging a Battery without Overcharging", issued to Aranovich et al., teaches a method of terminating charging based on a plurality of termination voltages stored in a look-up table. The particular termination voltage used is dependent upon cell temperature. As the temperature increases, the termination voltage used to terminate charging is reduced, thereby reducing the overall energy stored. (Presuming a lithium-based battery, the amount of energy stored in the battery is proportional to the voltage across the cell.)

The problem with this prior art solution is that it unnecessarily reduces the amount of run time a user can get from a battery pack. To better understand this, imagine a user working on a laptop coupled to a docking station. The user has an initially discharged battery pack, and couples the laptop to the docking station to work for a couple of hours. During this two hour period, a microprocessor may reach temperatures near 70 degrees centigrade. Using the method of the '389 patent, the battery pack would always be charged less than capacity, due to the elevated temperature and correspondingly reduced termination voltage. Consequently, the user, who may have a battery pack offering four hours of run time, would always get less run time unsing the method of the '389 patent.

The present invention in contrast to the prior art, offers a method that considers not only stored energy and temperature, but also the amount of time at which the battery is exposed to elevated temperatures. Experiments conducted in the development of this method show that short term exposure of cells to elevated temperatures, even when considered cumulatively, does not significantly degrade the storage capacity of a the cells. Experimental data suggests that a cell must be held at its maximum capacity (for example, the capacity corresponding to a maximum termination voltage of 4.2 V for a single lithium-ion cell) for roughly twelve or more hours for significant damage to occur. Consequently, the present method reduces the amount of energy stored within the battery's cells, but only after the cells have been exposed to an excessive temperature for at least a predetermined amount of time. The reduction in the amount of energy stored within the cell greatly extends the amount of time at which the cell may be exposed to high temperatures before cell degradation begins.

Referring now to FIG. 1, illustrated therein is one preferred embodiment of a method of charging in accordance with the invention. Note that for discussion purposes, the method of FIG. 1 uses exemplary values associated with a single, typical, lithium-ion cell, like those manufactured by Sanyo Corporation for example. It will be clear to those of ordinary skill in the art that the method of FIG. 1 may be modified for multiple cell packs by adjusting the termination voltages as dictated by cell or cell bank configuration. The method may also be modified for different chemistries by adjusting the time and temperature thresholds.

The method begins at step 101 when a processor controlling the charging circuit reads the cell temperature. At step 102, if the cell temperature exceeds a predetermined threshold, shown here as 55° C., the processor moves to step 103 and reads the amount of energy stored within the cell. As noted above, for a lithium-based cell, the amount of energy stored corresponds to the voltage across the cell, although it will be obvious to those of ordinary skill in the art that other methods for determining the amount of stored energy may also be used, including the use of fuel gauging circuitry for example.

The voltage measured at step 103 is then compared to a maximum threshold at step 104. Continuing with the single cell, lithium-ion battery as the exemplary embodiment, if the voltage is equal to or greater than its maximum termination voltage of 4.2 V, a timer is started at step 105. (Note that 4.2 V is a common termination voltage of lithium-ion cells, although some lithium-ion cells have a termination voltage as low as 4.1 V. Chemistries other than lithium may, of course, have different termination voltages.) The method continues to monitor the cell voltage and temperature for a predetermined time as shown in step 106 and the corresponding feedback line.

Once the maximum voltage has been maintained for a potentially cell damaging amount of time, shown at step 106 as a suggested 10 hours or more, the method proceeds to reduce the amount of energy stored within the cell at step 109. This reduction may either be automatic, or optionally prompted by a user at step 107. An exemplary time for prompting is two hours. The user may even place the method in "snooze mode" for a short period if they are unsure as to whether a reduction in battery capacity is desired. A suggested snooze time, as shown in step 108, is 30 minutes.

To recap, a processor that can control a charging circuit monitors the temperature of a cell. When the temperature exceeds a predetermined threshold, the processor monitors the amount energy stored within the cell, preferably by monitoring the voltage across the cell. When both the temperature exceeds a predetermined temperature threshold, like 55° C., and the voltage exceeds a predetermined capacity (or voltage) threshold, like 4.2 V, for at least a predetermined time, like 10 hours, the method reduces the amount of energy stored within the cell. A preferred reduction would be such that the battery voltage was at least 1% below the capacity threshold, which is 4.15 V for the single-cell, lithium-ion application. The reduction in capacity may be either automatic or as a result of a user prompt.

The method offers many advantages over the prior art. Referring to the example given above, using the present method, if that user had used the computer for the two hours in the docking station, the user would have a battery charged to full capacity rather than something less than full capacity. If the user were about to jump on an airplane from Atlanta to California, for example, he would have a battery that would last for the entire four hour trip. Using the prior art method, his computer would die somewhere between Texas and Nevada.

Figure 2:
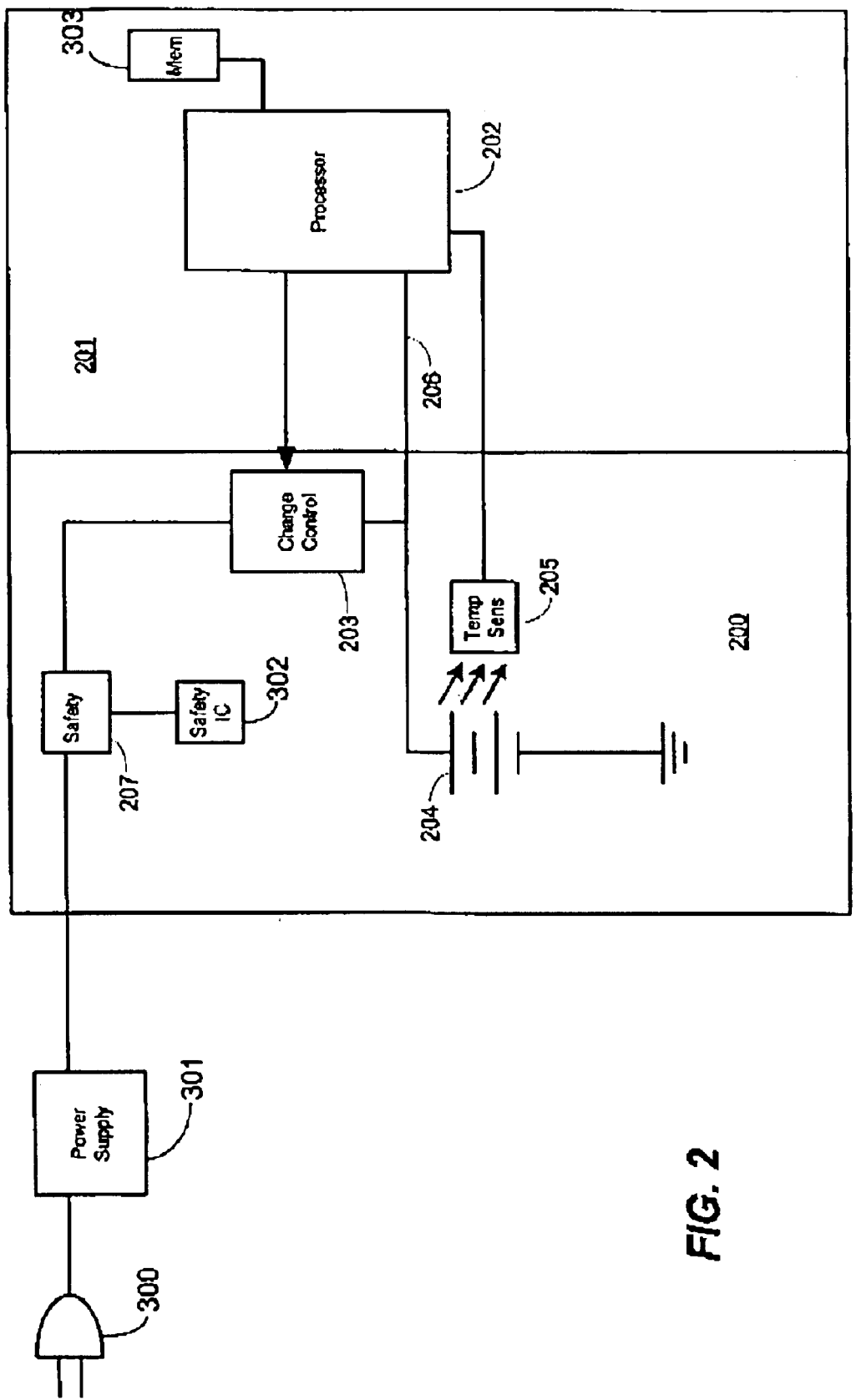
FIG. 2 illustrates an exemplary architecture upon which the method of FIG. 1 may be executed.

Referring now to FIG. 2, illustrated therein is one preferred embodiment of a circuit architecture upon which the method may be executed. A battery 200 is provided having at least one electrochemical cell 204 disposed therein. The battery further includes safety circuitry 207 for protecting against battery faults, and charging circuitry 203 for controlling the current being delivered to the cell 204. The safety circuitry 207 and charging circuitry 203 may be combined into a single circuit. Components 300–303 are present in FIG. 2.

A processor 202 capable of monitoring the amount of energy stored in the cell 204, the temperature of the cell 204, and the amount of elapsed time is provided. In this exemplary embodiment, the processor 202 is disposed in the host 201. This configuration is popular in both laptop and PDA configurations. Alternatively, the processor 202 may be a smart battery processor that is disposed in the battery 200.

A temperature sensor 205, like a thermistor for example, is provided for sensing the temperature of the cell. For typical lithium-ion applications, the amount of energy stored in the cell 204 is proportional to the voltage across the cell 204, which is read by a voltage sensing line 206. Other chemistries may not exhibit this energy-voltage proportionality, and other energy storage measurement techniques, like fuel gauging, may be preferential.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while preferred embodiments recited herein relate to single cell, lithium-ion applications, it will be clear to those of ordinary skill in the art that the invention may be applied to other configurations as well. For instance, in a system with four lithium-ion cells in series, the maximum voltage threshold would be four times the single maximum voltage threshold.

What is claimed is:

1. A method of charging a battery, the method comprising the steps of:
   a. monitoring a temperature of at least one rechargeable cell disposed within the battery;
   b. monitoring an amount of energy stored within the at least one rechargeable cell;
   c. monitoring time when both the temperature exceeds a predetermined temperature threshold and the amount of energy stored exceeds a predetermined capacity threshold; and
   d. reducing the amount of energy stored within the at least one rechargeable cell when both the temperature exceeds the predetermined temperature threshold and the amount of energy stored exceeds the predetermined capacity threshold for at least a continuous, predetermined amount of time.

2. The method of step 1, wherein the monitoring the amount of energy is accomplished by a method selected from the group consisting of measuring a voltage across the at least one rechargeable cell and reading a fuel gauge.

3. The method of step 2, wherein the monitoring the amount of energy is accomplished by measuring a voltage across the at least one rechargeable cell, further wherein the predetermined capacity threshold comprises a voltage of at least 4.1 V across the at least one rechargeable cell.

4. The method of claim 3, wherein the reducing the amount of energy comprises discharging the at least one rechargeable cell until the voltage across the cell is at least 50 mV below the predetermined capacity threshold.

5. The method of claim 1, wherein the predetermined temperature threshold is at least 55 degrees centigrade.

6. The method of claim 1, wherein the reducing the amount of energy comprises a reduction of at least 1 per cent of a maximum energy capacity of the at least one rechargeable cell.

7. The method of claim 1, further comprising the step of prompting a user prior to the reducing the amount of energy.

8. The method of claim 7, further comprising the step of waiting at least a predetermined wait time as directed by a user prior to the reducing the amount of energy.

9. The method of claim 1, wherein the predetermined amount of time is at least 10 hours.

10. A method of charging a rechargeable, electrochemical cell, the method comprising the steps of:
   a. providing a battery pack comprising at least one electrochemical cell;
   b. providing a processor capable of measuring a temperature and a voltage of the at least one electrochemical cell, the processor further being able of measuring a duration of time;
   c. monitoring the temperature of at least one electrochemical cell;
   d. monitoring the voltage of the at least one electrochemical cell;
   e. monitoring time when both the temperature exceeds a predetermined temperature threshold and the voltage exceeds a predetermined voltage threshold; and
   f. reducing an amount of energy stored within the at least one electrochemical cell by at least one percent when both the temperature exceeds the predetermined temperature threshold and the voltage exceeds the predetermined voltage threshold for at least a continuous, predetermined amount of time.

11. The method of step 10, wherein the predetermined voltage threshold comprises a voltage of at least 4.1V across the at least one electrochemical cell.

12. The method of claim 11, wherein the reducing the amount of energy comprises discharging the at least one electrochemical cell until the voltage across the cell Is at least 50 mV below the predetermined voltage threshold.

13. The method of claim 10, wherein the predetermined temperature threshold is at least 55° centigrade.

14. The method of claim 10, further comprising the step of prompting a user prior to reducing the amount of energy.

15. The method of claim 14, further comprising the step of waiting at least a predetermined wait time as directed by a user prior to reducing the amount of energy.

16. The method of claim 10, wherein the predetermined amount of time is at least 10 hours.

* * * * *